(12) United States Patent
Augustsson

(10) Patent No.: US 6,292,599 B1
(45) Date of Patent: Sep. 18, 2001

(54) WAVELENGTH SELECTIVE SWITCHING ELEMENT

(75) Inventor: Torsten Augustsson, Upplands Väsby (SE)

(73) Assignee: Telefonaktiebolaget LM Ericcson (publ), Stockholm (SE)

( * ) Notice: Subject to any disclaimer, the term of this patent is extended or adjusted under 35 U.S.C. 154(b) by 0 days.

(21) Appl. No.: 09/339,168

(22) Filed: Jun. 24, 1999

(30) Foreign Application Priority Data

Jun. 25, 1998 (SE) .................................................. 9802254

(51) Int. Cl.[7] ...................................................... G02B 6/35
(52) U.S. Cl. .................................... 385/16; 385/3; 385/17
(58) Field of Search .............................. 385/1–10, 15–24; 359/115, 117, 125–128, 130

(56) References Cited

U.S. PATENT DOCUMENTS

| 5,044,715 | * | 9/1991 | Kawachi et al. ........................ 385/42 |
| 5,446,809 | | 8/1995 | Fritz et al. . |
| 5,703,975 | | 12/1997 | Miller et al. . |

* cited by examiner

Primary Examiner—John D. Lee
Assistant Examiner—Michelle R. Connelly-Cushwa

(74) Attorney, Agent, or Firm—Burns, Doane, Swecker & Mathis, L.L.P.

(57) ABSTRACT

The invention relates to a device and a method for switching optical wavelength channels. Said optical wavelength channels are introduced into at least one access waveguide provided on a first side of a first multi-mode waveguide (10). Subsequently, the wavelength channels are transmitted through said multi-mode waveguide (10) and projected on at least two connection waveguides provided on the opposite side. Subsequently, the optical wavelength channels are transmitted through the connection waveguides. For each wavelength selective cross-connection structure (2, 4, 6, 8) the phase is changed for a reflecting wavelength of two phase control elements (C1, C2, D1, D2, E1, E2, F1, F2) arranged in a first and a second connection waveguide on a first side of said wavelength selective cross-connection structure (2, 4, 6, 8), simultaneously as at a second side of said wavelength selective cross-connection structure (2, 4, 6, 8) said reflecting wavelength phase remains relatively unchanged. For each wavelength selective cross-connection structure (2, 4, 6, 8) the phase is changed for transmitting wavelengths once in a first and a second direction per wavelength selective cross-connection structure (2, 4, 6, 8). The phase difference between the optical signal in each access waveguide provided on the first side of the second multi-mode waveguide (20) determines where the optical signal is focused on the opposite side.

17 Claims, 2 Drawing Sheets

WAVELENGTH SELECTIVE SWITCHING ELEMENT

TECHNICAL FIELD

The invention relates to an optical wavelength selective device, and more particularly to a wavelength selective switch for re-routing wavelength channels in an optical network, in which each wavelength channel can be re-routed separately and independently on the other wavelength channels. The invention also relates to a method for re-routing wavelength channels in an optical network.

STATE OF THE ART

To be able to further increase the capacity on already existing optical networks, there are a number of different known methods. One way is to use so-called wavelength division multiplex (WDM) technology for improving the degree of operation of available bandwidth connection an optical fibre in the optical network. To be able to increase the flexibility of the network, devices which can provide re-routing of traffic in the optical network are necessary. Such devices for re-routing traffic are also suitable for employing the network in the most effective way as possible and at interruption in the network. To be able to provide re-routing for each wavelength channel individually, wavelength selective switches are required.

In "Wavelength Division Multiplexer with Photoinduced Bragg Gratings Fabricated in a planar Lightwave Circuit Type Asymmetric Mach Zehnder Interferometer on Si", Y. Hibino et al, IEEE Photonics Technology Letters, Vol. 8, No. 1, January 1996, 99 84–86 an optical element is disclosed in which Bragg-gratings and phase control elements are used in a Mach Zehnder interferometer. The proposed applications are wavelength division multiplexing and wavelength division de-multiplexing.

However, the above disclosed switch cannot be used as a wavelength selective switch. If the above disclosed device is to used for add/drop of more channels, a number of devices are required equal to the number of handled add/drop pairs. This type of device is, relatively hard to re-configure, i.e. inflexible.

The problems with above the described technology as regards wavelength selective switches is that these require very large complicated structures or several components, which results in large power losses and a high cost.

DISCLOSURE OF THE INVENTION

To increase the capacity in an optical transfer system, a plurality of different methods may be employed, for instance, wavelength division multiplexing, transmission channels are multiplexed and de-multiplexed on different carrier wavelengths to and from an information flow. Said multiplexing and de-multiplexing require optical wavelength selective devices. It can also be desirable to determine transmission path through the optical network for each wavelength channel individually. For that purpose, switching components are required with wavelength selective properties.

One problem with known wavelength selective switches is that these contribute to large power losses.

Another problem with known wavelength selective switches is that known wavelength selective switches have a relatively complicated structure and in all known cases a relatively large number of different elements.

Yet another problem is that known wavelength selective switches are relatively expensive to manufacture based on above disclosed complicated structure and the number of comprised components.

The present invention tackles the problem by means of a wavelength selective switch comprising at least two multi-mode waveguides, at least one wavelength selective cross-connection structure, at least two phase control elements and at least four connection waveguides. The wavelength selective cross-connection structure is arranged between a first and a second multi-mode waveguide. Said first multi-mode waveguide is provided with at least one access waveguide on a first side and at least two access waveguides on a second side and said second multi-mode waveguide is provided with at least two access waveguides on a first side and at least one access waveguide on a second side. Said wavelength selective cross-connection structure is provided with at least two access waveguides on a first and a second side.

At a wavelength selective cross-connection structure, a first access waveguide on the second side of the first multi-mode waveguide is arranged to a first access waveguide on the first side of the wavelength selective cross-connection structure via a first connection waveguide, a second access waveguide on the second side of the first multi-mode waveguide arranged to a first access waveguide on the second side of the wavelength selective cross-connection structure via a second connection waveguide, and a second access waveguide on the first side of the wavelength selective cross-connection structure is arranged to a first access waveguide on the first side of the second multi-mode waveguide via a third connection waveguide and a second access waveguide on the second side of the wavelength selective cross-connection structure is arranged to a second access waveguide on the first side of the second multi-mode waveguide via a fourth connection waveguide.

The phase control elements are arranged in the connection waveguides on one of the sides of the wavelength selective cross-connection structure.

At a cross-connection structure there are two different so-called Mach-Zehnder paths for each particular wavelength in the optical signal. A first Mach-Zehnder path goes from a first access waveguide on the second side of the first multi-mode waveguide to the second access waveguide on the first side of the second multi-mode waveguide via the first and the fourth connection waveguide and via the wavelength selective cross-connection structure for wavelengths which are transmitted through the cross-connection structure.

A second Mach-Zehnder path goes from a second access waveguide on the second side of the first multi-mode waveguide to the first access waveguide on the first side of the second multi-mode waveguide via the second and the third connection waveguide and via the wavelength selective cross-connection structure for wavelengths which are transmitted through the cross-connection structure.

A third Mach-Zehnder path goes from a first access waveguide on the second side of the first multi-mode waveguide to a first access waveguide on the first side of the second multi-mode waveguide via the first and the third connection waveguide and via the wavelength selective cross-connection structure for wavelengths which are reflected by the cross-connection structure.

A fourth Mach-Zehnder path goes from a second access waveguide on the second side of a first multi-mode waveguide to the second access waveguide on the first side of the second multi-mode waveguide via the second and the fourth connection waveguide and via the wavelength selective cross-connection structure for wavelengths which are reflected by the cross-connection structure.

Only wavelengths which are reflected in any cross-connection structure can be controlled actively, i.e. the wavelength which goes via the third or fourth Mach-Zehnder path as disclosed above.

Said Mach-Zehnder paths are preferably equal in length in the wavelength selective switch element according to the invention.

Thus, for a wavelength selective cross-connection structure there are two different Mach-Zehnder paths for wavelengths which are reflected by the cross-connection structure and two different Mach-Zehnder paths for wavelengths which are transmitted by the cross-connection structure. Thus, for two different Mach-Zehnder paths for two different wavelengths and for N wavelength selective cross-connection structures there are 2×N different Mach-Zehnder paths for N wavelengths.

The first and the second multi-mode waveguide preferably have the same length-width ratio when they are of the same type, e.g., a 2×2 type. In an embodiment according to the invention the multi-mode waveguide can comprise a MMI waveguide.

At two or more wavelength selective cross-connection structures for each wavelength selective cross-connection structure, two phase control elements and two connection waveguides are added. Each wavelength selective cross-connection structure is provided with two phase control elements on the opposite side in relation to a nearest arranged wavelength selective cross-connection structure. The wavelength selective cross-connection structures are mutually arranged to each other via connection waveguides from an access waveguide on a first wavelength selective cross-connection structure to another access waveguide on an adjacent wavelength selective cross-connection structure. Said access waveguide is selected to being nearest to each other and on the same side.

According to a method of the invention for re-routing optical wavelength channels in an optical network, wavelength channels are exited in at least one access waveguide provided on a first side of a first multi-channel waveguide. The optical wavelength channels are then transmitted through said first multi-mode-waveguide and projected on at least two connection waveguides provided on opposite side in relation to said access waveguide. Subsequently, the optical wavelength channels are transmitted through the connection waveguides. For each wavelength selective cross-connection structure, the phase is changed for a reflecting wavelength two times by two phase control elements arranged in a first and a second connection waveguide on a first side of said wavelength selective cross-connection structure, simultaneously as at a second side of the wavelength selective cross-connection structure, the phase of the reflective wavelength remains relatively unchanged.

For each wavelength selective cross-connection structure, the phase for transmitting wavelengths is changed once. The optical wavelength channels are excited via at least two connection waveguides in a second multi-mode waveguide. The phase difference of each wavelength will be decisive for how much power of said wavelength and to which of the output waveguides of the multi-mode waveguide each wavelength is transmitted.

The phase control elements belonging to a particular wavelength selective cross-connection structure operate synchronously and change phase to the same extent.

According to an embodiment of the invention, the wavelength selective directional switching structures are of MMI-Bragg-grating type.

The object of the present invention is to obtain a wavelength selective switch, in which each wavelength can be switched independently of the rest of the wavelengths and to all possible selections of outputs, which by its structure is so simple and compact as possible, so that the manufacturing cost thereby can be reduced compared to known techniques.

An advantage of the present invention is that the power loss can be kept relatively low.

Another advantage of the present invention is that its performance, such as cross-talk etc. can be improved compared to prior art.

The invention will now be described in more detail with reference to preferred embodiments and to the appended drawings.

PREFERRED EMBODIMENTS

Figure 1:
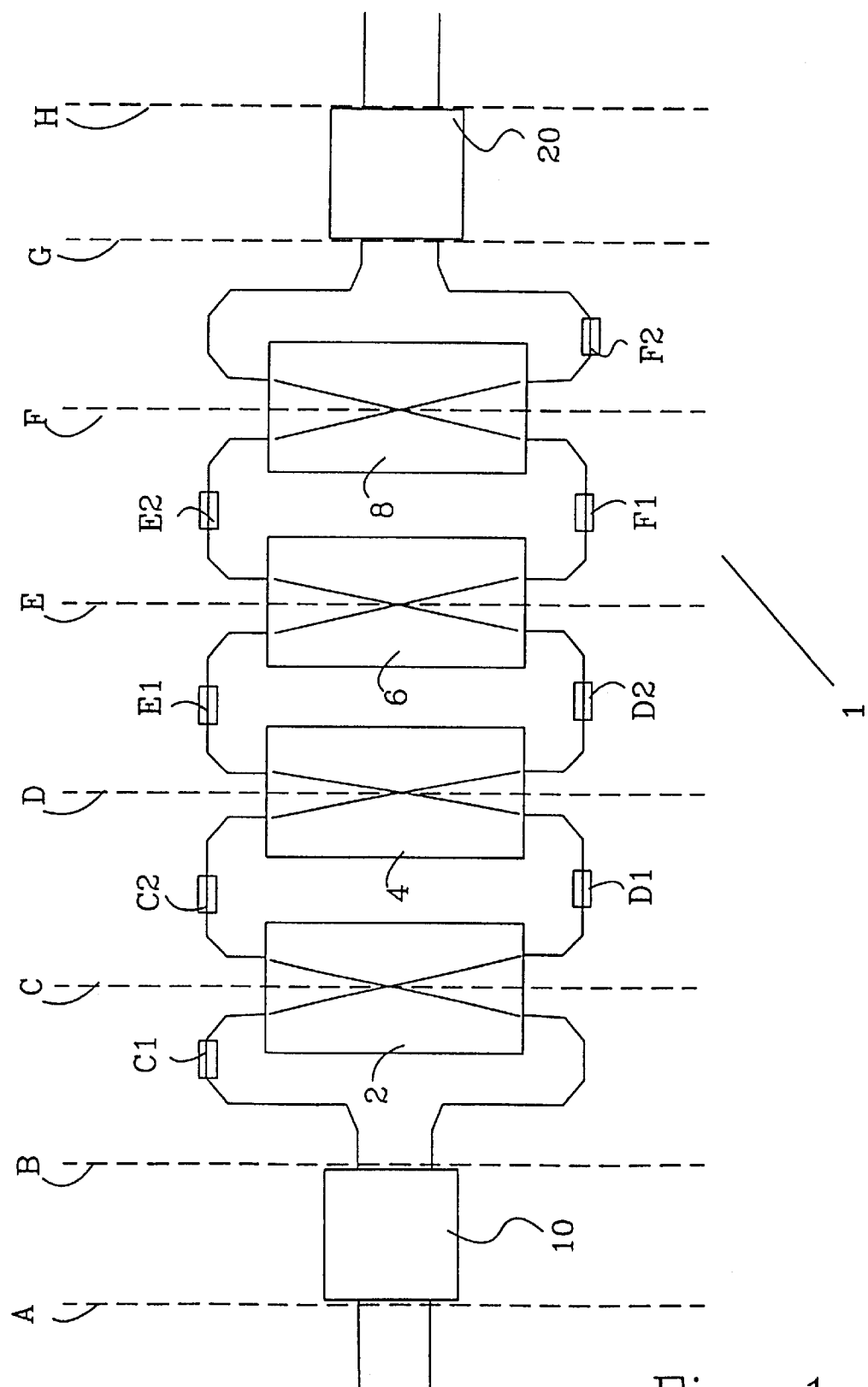
FIG. 1 shows an embodiment of a wavelength selective switch according to the invention.

FIG. 1 shows an embodiment of a wavelength selective switch 1 according to the invention. The wavelength selective switch 1 comprises two multi-mode waveguides 10, 20, four wavelength selective cross-connection structures 2, 4, 6, 8, eight phase control elements C1, C2, D1, D2, E1, E2, F1, F2, ten connection waveguides and access waveguides provided on both of the multi-mode waveguides 10, 20 and on the cross-connection structures 2, 4, 6, 8.

An optical signal comprising a number of different wavelengths is excited into the access wave guide provided on a first side of a first multi-mode waveguide 10. The optical signal is transmitted through the multi-mode waveguide 10 and projected on the access waveguides provided on an opposite side compared to where the optical signal was excited. The signal is projected depending on length-width ratio on the multi-mode waveguide 10 and the arrangement of the access waveguides. Assume that length-width ratio is like that an optical signal which is excited in at a first side of the multi-mode waveguide 10 is projected in the same way in both of the access waveguides on the opposite side, i.e. that the optical signal has been divided into half the intensity in both of the access waveguides. To the access waveguides on the second side of the first multi-mode waveguide 10, there are provided connection waveguides. A first connection waveguide is connected to a first access waveguide on a first side of a first wavelength selective cross-connection structure 2. A second connection waveguide is connected to a first access waveguide provided on a second side of the first wavelength selective cross-connection structure 2. One of these connection waveguides comprises a phase control element C1. In the embodiment illustrated in FIG. 1, said phase control element is comprised in said first connection waveguide. A second wavelength selective cross-connection structure 4 is arranged to the first wavelength selective cross-connection structure via two connection waveguides. A second access waveguide provided on the first side of the first wavelength selective cross-connection structure 2 is arranged to a first access waveguide on the first side of the second wavelength selective cross-connection structure 4 via a third connection waveguide. A second access waveguide on the second side of the first wavelength selective cross-connection structure 2 is arranged to a first access waveguide on a second side of the second wavelength selective cross-connection structure 4 via a fourth connection waveguide.

In FIG. 1, it is illustrated that four wavelength selective cross-connection structures 2, 4, 6, 8 are arranged after each other. The wavelength selective cross-connection structures 2, 4, 6, 8 are mutually arranged to each other via connection waveguides from access waveguide on a first wavelength selective cross-connection structure to another access waveguide on an adjacent wavelength selective cross-connection structure, in which said access waveguide is selected so that they are nearest to each other on the same side.

A last wavelength selective cross-connection structure 8 is arranged to a second multimode waveguide 20 via connection waveguides. A second access waveguide on a first side of the last wavelength selective cross-connections structure 8 is arranged to a first access waveguide on a first side of the second multi-mode waveguide 20 via a connection waveguide. A second access waveguide on a second side of the last wavelength selective cross-connection structure 8 is arranged to a second access waveguide on the first side of the second multi-mode waveguide 20 via a connection waveguide. On a second side of the second multi-mode waveguide 20, illustrated in the embodiment in FIG. 1, there are provided two waveguides.

The optical signal which was fed to the access waveguide along section A on the first side of the first multi-mode waveguide 10 is transmitted as described above first through said first multi-mode waveguide 10 and projected along section B on both connection waveguides arranged on the opposite side in relation to said access waveguide. Subsequently, the optical signal is further transmitted in both of the connection waveguides. In one of these connection waveguides, a phase control element C1 is arranged. Said phase control element C1 influences all wavelengths passing therethrough. The optical signal is then transmitted into the first wavelength selective cross-connection structure 2 at section C. Each one of these wavelength selective cross-connection structures 2, 4, 6, 8 at section C, D, E and F are arranged to reflect a wavelength and transmit the remaining. Assume that which is first wavelength selective cross-connection structure 2 at section C is arranged to reflect a wavelength $\lambda 1$, that the second wavelength selective cross-connection structure 4 at section D is arranged to reflect a wavelength $\lambda 2$, that the third wavelength selective cross-connection structure 6 at section E is arranged to reflect a wavelength 13, and that a fourth wavelength selective cross-connection structure 8 at section F is arranged to reflect a wavelength $\lambda 4$.

In FIG. 1, it is illustrated that four wavelength selective cross-connection structures 2, 4, 6, 8 are arranged after each other. The wavelength selective cross-connection structures 2, 4, 6, 8 are mutually arranged to each other via connection waveguides from access waveguide on a first wavelength selective cross-connection structure to another access waveguide on an adjacent wavelength selective cross-connection structure, in which said access waveguide is selected so that they are nearest to each other on the same side.

A last wavelength selective cross-connection structure 8 is arranged to a second multimode waveguide 20 via connection waveguides. A second access waveguide on a first side of the last wavelength selective cross-connections structure 8 is arranged to a first access waveguide on a first side of the second multi-mode waveguide 20 via a connection waveguide. A second access waveguide on a second side of the last wavelength selective cross-connection structure 8 is arranged to a second access waveguide on the first side of the second multi-mode waveguide 20 via a connection waveguide. On a second side of the second multi-mode waveguide 20, illustrated in the embodiment in FIG. 1, there are provided two waveguides.

The optical signal which was fed to the access waveguide along section A on the first side of the first multi-mode waveguide 10 is transmitted as described above first through said first multi-mode waveguide 10 and projected along section B on both connection waveguides arranged on the opposite side in relation to said access waveguide. Subsequently, the optical signal is further transmitted in both of the connection waveguides. In one of these connection waveguides, a phase control element C1 is arranged. Said phase control element C1 influences all wavelengths passing therethrough. The optical signal is then transmitted into the first wavelength selective cross-connection structure 2 at section C. Each one of these wavelength selective cross-connection structures 2, 4, 6, 8 at section C, D, E and F are arranged to reflect a wavelength and transmit the remaining. Assume that which is first wavelength selective cross-connection structure 2 at section C is arranged to reflect a wavelength $\lambda 1$, that the second wavelength selective cross-connection structure 4 at section D is arranged to reflect a wavelength $\lambda 2$, that the third wavelength selective cross-connection structure 6 at section E is arranged to reflect a wavelength 13, and that a fourth wavelength selective cross-connection structure 8 at section F is arranged to reflect a wavelength $\lambda 4$.

For the wavelengths $\lambda 1, \lambda 2, \lambda 3, \lambda 4$, it is stated that each one of these wavelengths are reflected by one and only one wavelength selective cross-connection structure 2, 4, 6, 8 and transmitted through the rest.

According to the embodiment shown in FIG. 1, each wavelength channel, which is reflected by any one of the wavelength selective cross-connection structures, which are transmitted out of one of the connection waveguides along section B, will be influenced by two phase control elements compared to the wavelength channels which are reflected by any of the wavelength selective cross-connection structures, which are transmitted out of the second connection waveguide along section B. When, for instance, wavelength AX reaches the first side of the second multi-mode waveguide 20 along section G, the phase will be different in the first and the second access waveguide depending on, as described above, said wavelength having been influenced by a different number of phase control elements C1, C2, D1, D2, E1, E2, F1, F2. The phase for each of the different reflecting wavelengths in the first and the second access waveguide along section G will differ from each other. In one of these access waveguides along section G in FIG. 1, for a given reflected wavelength, the phase has changed twice compared to the phase in the second access waveguide. Each reflected wavelength has a unique path, Mach-Zehnder path, through the structure. In that way a wavelength can be influenced independently on the rest and by help of a suitable embodiment as regards length, width and arrangement of access waveguides on the second multi-mode waveguide 20, then each of the reflecting wavelengths can be directed to any output along section H.

For a given length-width ratio of the second multi-mode waveguide, the phase difference between the optical signals in the access waveguides along section G determines where the optical signal will be focused along section H.

The phase control elements preferably operate synchronously and with the same phase change.

Figure 2:
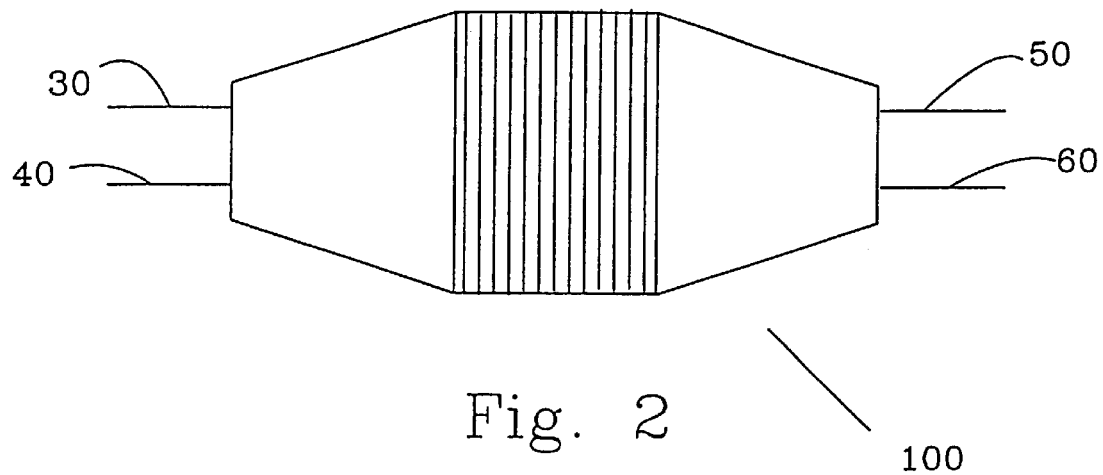
FIG. 2 shows an example of a symmetrical add/drop-structure based on a so-called MMIBg-principle.

In FIG. 2, an example of a wavelength selective cross-connection structure 100 is illustrated, which by advantage can be employed in the wavelength selective switch according to the invention. In principle, the wavelength selective cross-connection structure 100 in FIG. 2 is an add/drop mux element. The specific device in FIG. 2 is called a symmetrical MMI-Bragg-grating structure. Any add/drop element with functionality like the cross-connection structure in FIG. 2 is possible to use, but of most importance for the realisation of the component, is that this element does not have to be turned. When trimming is necessary the wavelength selective switch 1 can be impossible to operate if quite a few wavelengths shall be operated, i.e. when many cross-connection structures 2, 4, 6, 8 are required.

An optical signal is excited for instance at an access waveguide 40 in the cross-connection structure in FIG. 2. One channel is reflected to an access waveguide 30 and the rest are transmitted to an access waveguide 50. Due to reciprocity and the symmetry of the device, an optical signal which is excited at an access waveguide 50 will either be reflected to the access waveguide 50 or transmitted to the access waveguide 30.

The cross-connection structure is preferably symmetrical, i.e. if it is cut in the middle, both halves should be its own mirror-image.

The present wavelength selective switch 1 can be made of any monolithic semi-conducting system or dielectric waveguide system of $SiO_2$/Si type.

The wavelength selective switch can be arranged with all connection waveguides having the same length.

The invention is not limited to the above described and in the drawings illustrated embodiments, but can be modified within the appended claims.

What is claimed is:

1. A wavelength selective switch system for switching optical wavelengths comprising:
   two multi-mode waveguides;
   a first wavelength selective cross-connection structure;
   two phase control elements;
   four connection waveguides;
   said first wavelength selective cross-connection structure arranged between said two multi-mode waveguides,
   the first multi-mode waveguide having one access waveguide on a first side and two access waveguides on a second side,
   the second multi-mode waveguide having two access waveguides on a first side and one access waveguide on a second side,
   said first wavelength selective cross-connection structure having two access waveguides on a first side and two access waveguides on a second side,
   the first connection waveguide connecting the first access waveguide on the second side of the first multi-mode waveguide and the first access waveguide on the first side of the first wavelength selective cross-connection structure,
   the second connection waveguide connecting the second access waveguide on the second side of the first multi-mode waveguide and the first access waveguide on the second side of the first wavelength selective cross-connection structure,
   the third connection waveguide connecting the second access waveguide on the first side of the first wavelength selective cross-connection structure and the first access waveguide on the first side of the second multi-mode waveguide,
   the fourth connection waveguide connecting the second access waveguide on the second side of the first wavelength selective cross-connection structure and the second access waveguide on the first side of the second multi-mode waveguide,
   wherein the first phase control element is arranged in the first connection waveguide and the second phase control element is arranged in the third connection waveguide.

2. A wavelength selective switch according to claim 1, wherein the first and second multi-mode waveguides are MMI-waveguides.

3. A wavelength selective switch according to claim 2, wherein the first wavelength selective cross-connection structure is symmetrical.

4. A wavelength selective switch according to claim 2, wherein the first wavelength selective cross-connection structure is a MMI-Bragg grating structure.

5. A wavelength selective switch according to claim 1, wherein each of the phase control elements comprise:
   means for changing the phase of an optical signal.

6. A wavelength selective switch according to claim 1, wherein the four connection waveguides are of the same length.

7. A wavelength selective switch system for switching optical wavelengths comprising:
   two multi-mode waveguides; and
   a first wavelength selective cross-connection structure, a last wavelength selective cross-connection structure, and a plurality of intervening wavelength selective cross-connection structures connected in sequence between said first wavelength selective cross-connection structure and said last wavelength selective cross-connection structure, wherein each wavelength selective cross-connection structure comprises a first side and a second side;
   wherein the first side of the first wavelength selective cross-connection structure is connected to the first multi-mode waveguide by a first connection waveguide, and the second side of the first wavelength selective cross-connection structure is connected to the first multi-mode waveguide by a second connection waveguide,
   wherein the first side of the last wavelength selective cross-connection structure is connected to the second multi-mode waveguide by a third connection waveguide, and the second side of the last wavelength selective cross-connection structure is connected to the second multi-mode waveguide by a fourth connection waveguide,
   wherein the first side of the last wavelength selective cross-connection structure and the first side of each intervening wavelength selective cross-connection structure is connected to the first side of the preceding, adjacent wavelength selective cross-connection structure by a corresponding connection waveguide,
   wherein the second side of the first wavelength selective cross-connection structure and the second side of each intervening wavelength selective cross-connection structure is connected to the second side of the following, adjacent wavelength selective cross-connection structure by a corresponding connection waveguide, and
   wherein the first connection waveguide, the fourth connection waveguide and each connection waveguide associated with an intervening wavelength selective cross-connection structure contains a phase control element.

8. A wavelength selective switch system according to claim 7, wherein there are N different optical wavelengths, N wavelength selective cross-connection structures, and 2N different Mach-Zehnder paths for each of the N different optical wavelengths.

9. A wavelength selective switch system according to claim 7, wherein the first and second multi-mode waveguides are MMI-waveguides.

10. A wavelength selective switch system according to claim 9, wherein the wavelength selective cross-connection structures are is symmetrical.

11. A wavelength selective switch according to claim 9, wherein the wavelength selective cross-connection structures are MMI-Bragg grating structures.

12. A wavelength selective switch system according to claim 7, wherein each of the phase control elements comprise:

means for changing the phase of an optical signal.

13. A method for switching optical wavelength channels in an optical network comprising steps of:

receiving a number of optical wavelength channels at a first side of a first multi-mode waveguide;

dividing each optical wavelength channel such that a first and a second portion of each optical wavelength channel is focused into a first and a second connection waveguide, respectively, wherein the first and the second waveguides are associated with a second side of the first multi-mode waveguide;

transmitting the first and second portions of each optical wavelength channel from the first multi-mode waveguide to a second multi-mode waveguide in accordance with one or more wavelength selective cross-connection structures arranged in sequence between the first and second multi-mode waveguides, wherein each of the one or more wavelength cross-connection structures is associated with a corresponding wavelength;

in a given wavelength cross-connection structure, reflecting an optical wavelength channel, if the wavelength associated with the optical wavelength channel matches the wavelength corresponding to the given wavelength selective cross-connection structure, and transmitting an optical wavelength channel if the wavelength associated with the optical wavelength channel differs from the wavelength corresponding to the given wavelength selective cross-connection structure;

if the optical wavelength channel is reflected, shifting the phase of the first portion of the optical wavelength channel relative to the second portion of the optical wavelength channel such that the relative phase of the first and second portion of the optical wavelength channel differs at a first side of the second multi-mode waveguide; and focusing each optical wavelength channel at a second side of the second multi-mode waveguide as a function of the phase associated with the first portion and the phase associated with the second portion of each optical wavelength channel.

14. A method according to claim 13, wherein the first and second multi-mode waveguides are MMI-waveguides.

15. A method according to claim 13, wherein there are N different optical wavelengths, N wavelength selective cross-connection structures, and 2N different Mach-Zehnder paths for each of the N different optical wavelengths.

16. A method according to claim 13, wherein said step of shifting the phase of a first portion of the optical wavelength channel comprises:

transmitting the first portion of the optical wavelength channel through additional phase control elements as compared to the second portion of the optical wavelength channel.

17. A method according to claim 13, wherein said step of focusing each optical wavelength channel at the second side of the second multi-mode waveguide is a function of the length-width ratio of the first multi-mode waveguide and the length-width ratio second multi-mode waveguide.

* * * * *